United States Patent
Hyogo et al.

(10) Patent No.: US 6,708,869 B2
(45) Date of Patent: Mar. 23, 2004

(54) METHOD FOR PRODUCTION OF HEAT EXCHANGER

(75) Inventors: Yasunori Hyogo, Susono (JP); Akira Watanabe, Susono (JP); Ken Tohma, Susono (JP)

(73) Assignee: Mitsubishi Aluminum Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/219,978

(22) Filed: Aug. 14, 2002

(65) Prior Publication Data

US 2003/0084569 A1 May 8, 2003

(30) Foreign Application Priority Data

Aug. 14, 2001 (JP) ........................................ 2001-246071

(51) Int. Cl.$^7$ ............................................... B23K 31/02
(52) U.S. Cl. ..................... 228/183; 228/248.1; 228/254
(58) Field of Search .............................. 228/183, 248.1, 228/248.5, 254, 262.5, 262.51

(56) References Cited

U.S. PATENT DOCUMENTS

| | | | | |
|---|---|---|---|---|
| 4,409,036 A | * | 10/1983 | Vernam et al. .............. 148/551 |
| 4,410,036 A | * | 10/1983 | Kanada et al. ........... 165/134.1 |
| 4,412,869 A | * | 11/1983 | Vernam et al. .............. 148/689 |
| 4,595,662 A | * | 6/1986 | Mochida et al. ............... 501/15 |
| 4,678,112 A | * | 7/1987 | Koisuka et al. .............. 228/138 |
| 4,741,394 A | * | 5/1988 | Tanigawa et al. ........... 165/153 |
| 5,125,452 A | * | 6/1992 | Yamauchi et al. .......... 165/133 |
| 5,148,862 A | * | 9/1992 | Hashiura et al. ......... 165/134.1 |
| 5,176,205 A | * | 1/1993 | Anthony ..................... 165/133 |
| 5,246,064 A | | 9/1993 | Hoshino et al. |
| 5,251,374 A | * | 10/1993 | Halstead et al. ....... 29/890.047 |
| 5,594,930 A | * | 1/1997 | Terada et al. .................. 419/5 |
| 5,772,104 A | * | 6/1998 | Paulman ..................... 228/175 |
| 5,787,973 A | * | 8/1998 | Kado et al. ................. 165/153 |
| 6,113,667 A | * | 9/2000 | Hyogo et al. ................. 75/255 |
| 6,234,377 B1 | * | 5/2001 | Teshima et al. ............ 228/183 |

FOREIGN PATENT DOCUMENTS

| | | |
|---|---|---|
| EP | 0 847 830 | 6/1998 |
| EP | 0 976 486 | 2/2000 |
| GB | 2 299 287 | 10/1996 |
| JP | 58-003987 | 1/1983 |
| JP | 403114659 A | * 5/1991 |
| JP | 10-175061 | 6/1998 |
| JP | 11-000790 | 1/1999 |

OTHER PUBLICATIONS

US 2003/0084569A1 Hyogo et al. (May 8, 2003).*
US 20030015573A1 Kawahara et al. (Jan. 23, 2003).*
US 20020127135A1 Ohara et al. (Sep. 12, 2002).*
US 20030039856A1 Gillispie et al. (Feb. 27, 2003).*

* cited by examiner

Primary Examiner—Kiley Stoner
(74) Attorney, Agent, or Firm—Anderson Kill & Olick; Ewtene Lieberstein; Michael N. Meller

(57) ABSTRACT

A heat exchanger, characterized in that Al or Al alloy tubes, each having a thermally Zn-sprayed layer formed on the surface of it, and having a brazing filler metal layer formed on said thermally Zn-sprayed layer using a powdery brazing filler Al alloy composed of 5 to 60 weight % of Si and the balance of Al and unavoidable impurities, are combined with and brazed to an Al or Al alloy header having a brazing filler metal layer formed using a powdery brazing filler Al alloy composed of 5 to 60 weight % of Si and the balance of Al and unavoidable impurities. The tubes and the header are strongly bonded to each other, and Zn is uniformly diffused and distributed. So, the heat exchanger shows good corrosion resistance.

12 Claims, 3 Drawing Sheets

Section at tube/header joint
(after 480 hours of CASS test)

Thermal Zn splay only

Thermal Zn splay
and
powdery brazing filler metal coating

METHOD FOR PRODUCTION OF HEAT EXCHANGER

BACKGROUND OF THE INVENTIONS

The present invention relates to a method for production of a heat exchanger, which is brazed by using a powdery brazing filler metal, having excellent corrosion resistance and brazing property.

PRIOR ART

As a member of an assembled structure for a heat exchanger, a tube in which a brazing filler metal layer is formed on the surface of a thermally Zn-sprayed layer by coating a powdery brazing filler metal is already known (in patent publication No. Heisei 11-790). When this tube is brazed, the brazing filler metal will be molten and spread on the thermally Zn-sprayed surface causes Zn to uniformly diffuse on the surface of the tube. So, a uniform Zn-diffused layer will be formed on the surface of the tube, and the tube will have good corrosion resistance. If the tube is attached to a header and brazed with heating, it can be fixed.

On the other hand, a technique of coating a header with a powdery brazing filler metal is also known (in patent publication No. Heisei 10-175061). This technique allows the use of a bare material (extruded section) instead of a brazing sheet as the header, and the compressive strength of the header can be improved.

However, a heat exchanger, in which both the thermally Zn-sprayed tubes and the header are respectively provided with a brazing filler metal layer and assembled and brazed to each other, is not known.

Of the above-mentioned assembling methods, the former method is inferior since the bondability between the tubes and the header is not sufficient, depending on the brazing filler metal layer of the header. On the other hand, the latter method is superior since the tubes can be strongly brazed to the header. However, in the latter method, in the case where the thermally Zn-sprayed layer is formed on the surface of the tube, a layer having Zn at a high concentration is kept formed at the joint with the header in the longitudinal direction of the tube 10 as shown in FIG. 2, and corrosion 13 preferentially takes place in the layer, to pose a problem that it causes a through hole to be formed at the joint 12 between the tube 10 and the header 11.

OBJECT OF THE INVENTION

The present invention has been completed in view of the above-mentioned situation. The object of this invention is to provide a method for production of a heat exchanger in which the tubes and the header are strongly bonded to each other and which has excellent corrosion resistance.

SUMMARY OF THE INVENTION

The method for production of a heat exchanger to solve the above-mentioned problem, as the subject matter of claim 1 comprises the steps of preparing a powdery brazing filler Al alloy consisting of 5 to 60 weight % of Si and the balance of Al and unavoidable impurities; classifying it into a fine alloy powder and a coarse alloy powder; depositing the fine alloy powder on the Al or Al alloy tubes having the thermally Zn-sprayed layer formed on the surfaces; depositing the coarse alloy powder on the Al or Al alloy header; and brazing the tubes and the header to each other.

The method for production of a heat exchanger as the subject matter of claim 2 conforms to claim 1, wherein the average particle size of the powdery brazing filler Al alloy is 0.5 to 200 µm.

The method for production of the heat exchanger as the subject matter of claim 3 conforms to claim 2, wherein the average particle size of the powdery brazing filler metal of the brazing filler metal layer on the thermally Zn-sprayed tubes is 0.5 to 100 µm, while the average particle size of the powdery brazing filler metal of the brazing filler metal layer on the header is 1 to 200 µm, and the average particle size of the powdery brazing filler metal of the brazing filler metal layer on the header is larger than the average particle size of the powdery brazing filler metal of the brazing filler metal layer on the thermally Zn-sprayed tubes.

The method for production of the heat exchanger as the subject matter of claim 4 conforms to claim any one of claims 1 through 3, wherein the brazing filler metal layer of the thermally Zn-sprayed tubes and/or the brazing filler metal layer of the header contains a flux mixed.

The method for production of the heat exchanger as the subject matter of claim 5 conforms to claim 4, wherein the flux and the powdery brazing filler metal bond using a binder.

The method for production of the heat exchanger as the subject matter of claim 6 conforms to claims in any one of claims 1 through 3 or 5, wherein fins made of a Zn containing Al alloy dispose between the said tubes.

The method for production of the heat exchanger as the subject matter of claim 7 conforms to claim 4, wherein fins made of a Zn containing Al alloy dispose between the said tubes.

According to the heat exchanger produced by this invention, the brazing filler metal layer formed on the header allows the fillets of the brazing filler metal to be sufficiently formed at the joints with the tubes, and the Zn in the thermally Zn-sprayed layer diffuses quickly to average the Zn concentration. As a result, it is prevented that local corrosion takes place at the joints, to form through holes. Furthermore, the brazing filler metal layer formed on the thermally Zn-sprayed layer of the tubes contributes to the bonding with fins, and promotes the diffusion of Zn in the thermally Zn-sprayed layer, for uniforming the Zn concentration on the surfaces of the tubes as an action to enhance corrosion resistance. Moreover, Zn diffuses also into the brazing filler metal of the header, to improve the corrosion resistance at the joints.

The process for producing a heat exchanger as the subject matter of claim 1 can provide the above-mentioned action and effect, and since the prepared powdery brazing filler metal is classified for use, there is also an effect that the powdery brazing filler metal can be used without waste.

The present invention is described below in detail more.
[Si Content of a Powdery Brazing Filler Metal]
(In Common to Tubes and Header): 5 to 60 weight %

If the Si content is less than 5%, the function as a brazing filler metal is insufficient. If it is more than 60%, the erosion on the base metal becomes excessive to cause problems such as strength lowering, and furthermore, since the melting point of the brazing filler metal becomes 1150° C. or higher, melting in the production of the powdery brazing filler metal becomes difficult. So, the Si content is limited in the afore-said range.

[Thermally Zn-sprayed Layer of Tubes]

The thermally Zn-sprayed layer of the tubes prevents that the Si of the brazing filler metal erodes the base metal, to form through holes, and hence corrosion resistance is also improved. It is preferred that the thermally sprayed amount of the thermally Zn-sprayed layer is in a range of 3 to 20 g/m$^2$ (a further preferred range is 7 to 15 g/m$^2$), for the reasons described below. If the thermally sprayed amount of Zn is less than 3 g/m$^2$, the Zn concentration on the surface of the covering layer is too small to obtain a desired action. On the other hand, if the thermally sprayed amount of Zn is more than 20 g/m$^2$, a large amount of Zn in the covering layer migrates into the fillets after brazing. So, the fillets are preferentially corroded causing the tubes to be disconnected from the fins, or to cause corrosion at the joints between the tubes and the header, or to raise the Zn concentration of the covering layer, remarkably increasing the corrosion rate.

[Formation of Brazing Filler Metal Layer on Tubes]

Since the brazing filler metal molten and spread on the thermally Zn-sprayed surface causes Zn to uniformly diffuse on the surfaces of the tubes, a uniform Zn-diffused layer can be formed on the surfaces of the tubes, to let the tubes have good corrosion resistance. Since the bonding with the fins and the tube can be achieved by means of the powdery brazing filler metal, a bare material can be used as the fins.

FIG. 3 shows the Zn concentrations on the surface of a brazed tube in the case where the tube has a thermally Zn-sprayed layer only without a brazing filler metal layer, and it shows that Zn concentrations are different from region to region.

FIG. 4 shows the Zn concentrations on the surface of a brazed tube in the case where the tube has brazing filler metal layer formed on a thermally Zn-sprayed layer, and it shows that Zn concentrations are uniform.

[Average Particle Size of Powdery Brazing Filler Metal] (In the Brazing Filler Metal Layer of Tubes): 0.5 to 100 μm If the average particle size of the powdery brazing filler metal in the brazing filler metal layer of the tubes is less than 0.5 μm, the powder is so fine that it becomes difficult to handle the powder, and since the total surface area of the powder as a whole becomes large, the amount of the oxide on the powder becomes so large as to lower the brazing property. If the average particle size of the powdery brazing filler metal is more than 100 μm, the brazing filler metal cannot be applied thinly on the tubes, and the small clearance with the fins disposed between the tubes varies, making it hard to inhibit dimensional variations. Furthermore, the coated amount is likely to vary causing a problem that brazing failure is likely to occur. Therefore, it is desirable that the average particle size of the powdery brazing filler metal in the brazing filler metal layer of the tubes is in a range of 0.5 to 100 μm as described in claim 2. It is more desirable that the lower limit is 1 μm and that the upper limit is 50 μm.

[Average Particle Size of Powdery Brazing Filler Metal] (In Brazing Filler Metal Layer of Header): 1 to 200 μm If the average particle size of the brazing filler metal in the brazing filler metal layer of the header is less than 1 μm, the powder is so fine that it becomes difficult to handle the powder, and since the total surface area of the powder as a whole becomes large, the amount of the oxide on the powder becomes so large as to lower the brazing property. Since especially the header is larger in wall thickness than the tubes, when the brazing, the header is harder to raise the temperature than the tubes, and the average particle size greatly affects the brazing property. If the brazing property of the header declines, the bonding strength with the tubes declines, and furthermore Zn is not diffused sufficiently, being liable to cause local corrosion. As for the upper limit of the average particle size of the brazing filler metal in the brazing filler metal layer of the header, since there is no limit to the size unlike the tubes, a larger amount can be applied than that for the tubes. So, the upper limit can be 200 μm. Therefore, it is desirable that the average particle size of the powdery brazing filler metal in the brazing filler layer of the header is in a range of 1 to 200 μm as described in claim 2. It is more desirable that the lower limit is 51 μm and that the upper limit is 150 μm.

[Average Particle Size Ratio of Powdery Brazing Filler Metal]

(Average Particle Size of Brazing Filler Metal Layer of Header>Average Particle Size of Brazing Filler Metal Layer of Tubes)

It is desirable that the particle size of the powdery brazing filler metal of the tubes is smaller within the afore-said range and that the particle size of the powdery brazing filler metal of the header is larger within said range, as described above. If the average particle size of the powdery brazing filler metal in the brazing filler metal layer of the header is equal to or smaller than that of the powdery brazing filler metal in the brazing filler metal layer of the tubes, the melting of the brazing filler metal on the header side delays, and the brazing filler metal on the tube side is molten locally at the joints, to restrict the diffusion area of Zn. Depending on the brazing filler metal on the header side that is molten late, Zn is not sufficiently diffused, and a layer locally high in Zn concentration remains. Therefore, it is desirable that the average particle size ratio of both is such that the average particle size of the brazing filler metal layer of the header is larger than that of the brazing filler metal layer of the tubes as described in claim 2.

[Classification of Powdery Brazing Filler Metal]

For classifying the powdery brazing filler metal, various methods can be used, and such a method as sieving, air classification or wet classification can be used. For classification, a powdery brazing filler metal with an average particle size of 0.5 to 200 μm can be used. Furthermore, for classification, one reference size can be set for classifying the powder into a fine powder and a coarse powder in reference to the reference size. In another aspect, one reference size for a fine powder and another reference size for a coarse powder can be set for classifying the powder.

In view of efficiency, it is desirable to classify in reference to one reference size. The reference size of classification can be 32 to 100 μm.

DESCRIPTION OF THE PREFFERD EMBODIMENT

Figure 1:
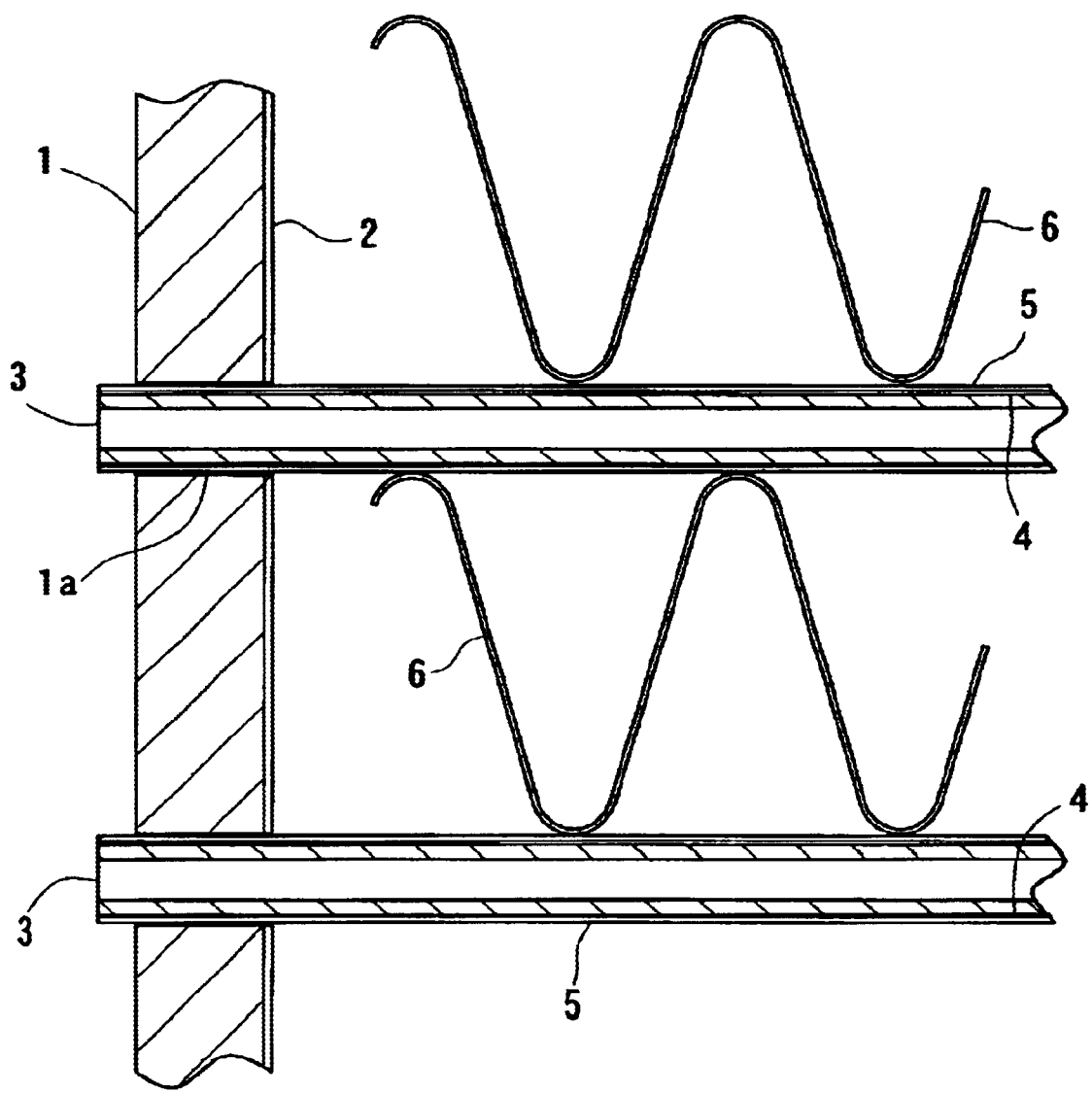
FIG. 1 is a partial sectional view showing a state where a header, tubes and fins are assembled in a production process in an embodiment of this invention.
Figure 2:
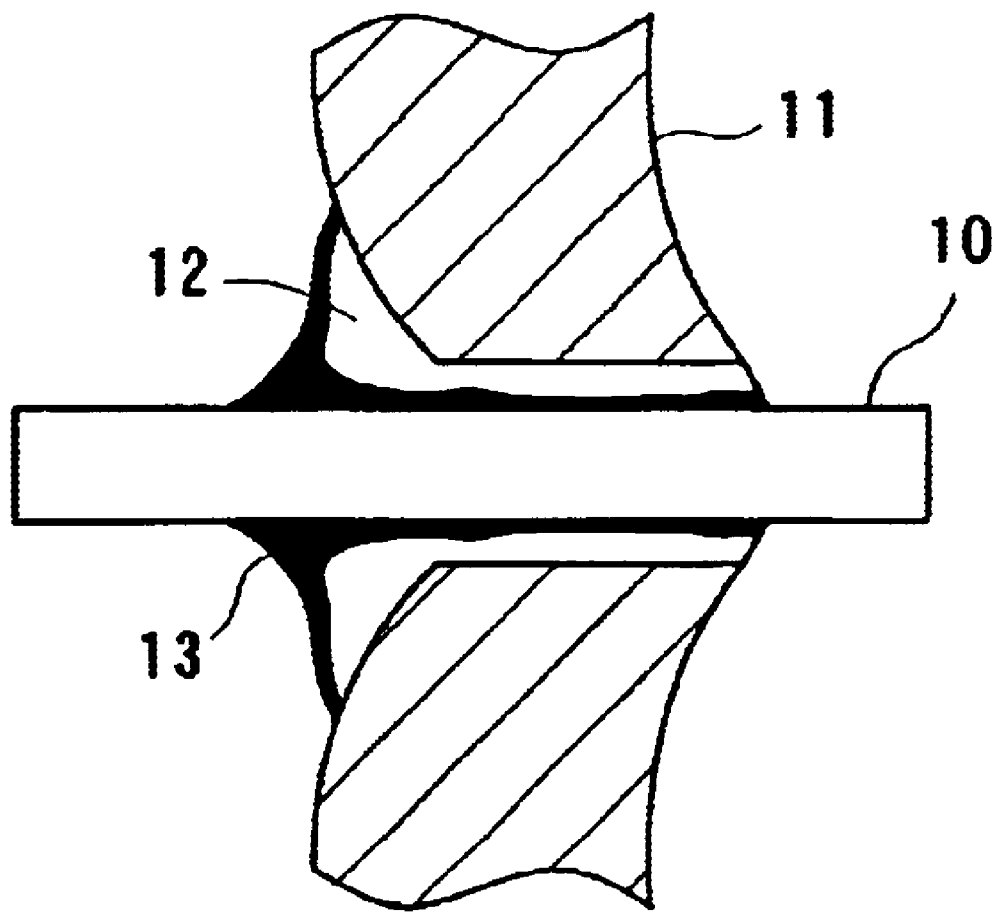
FIG. 2 is an enlarged sectional view showing a joint portion between a header and a tube in a conventional heat exchanger.
Figure 3:
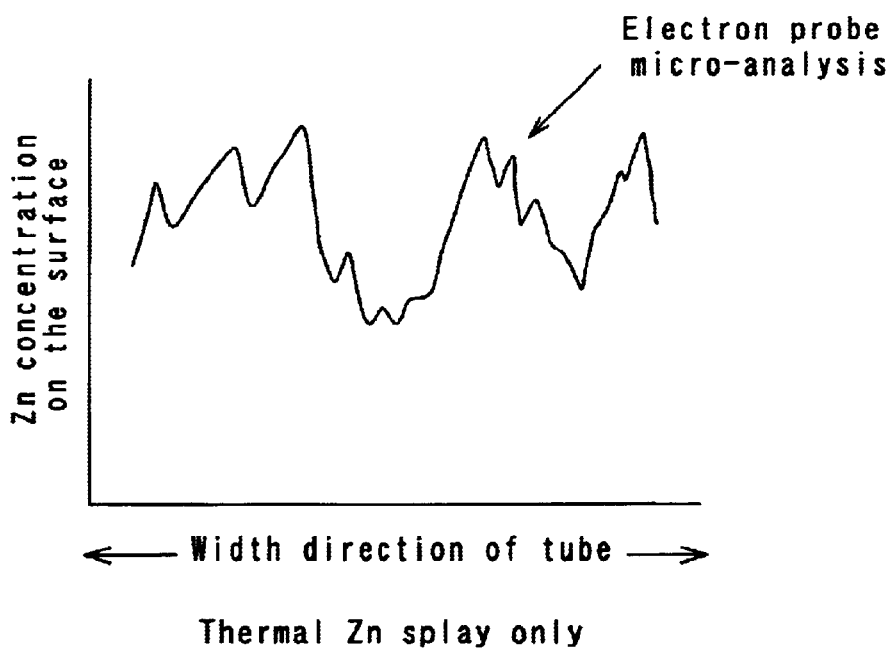
FIG. 3 is a graph showing the Zn concentration distribution on the surface of a tube after brazing in a conventional heat exchanger.
Figure 4:
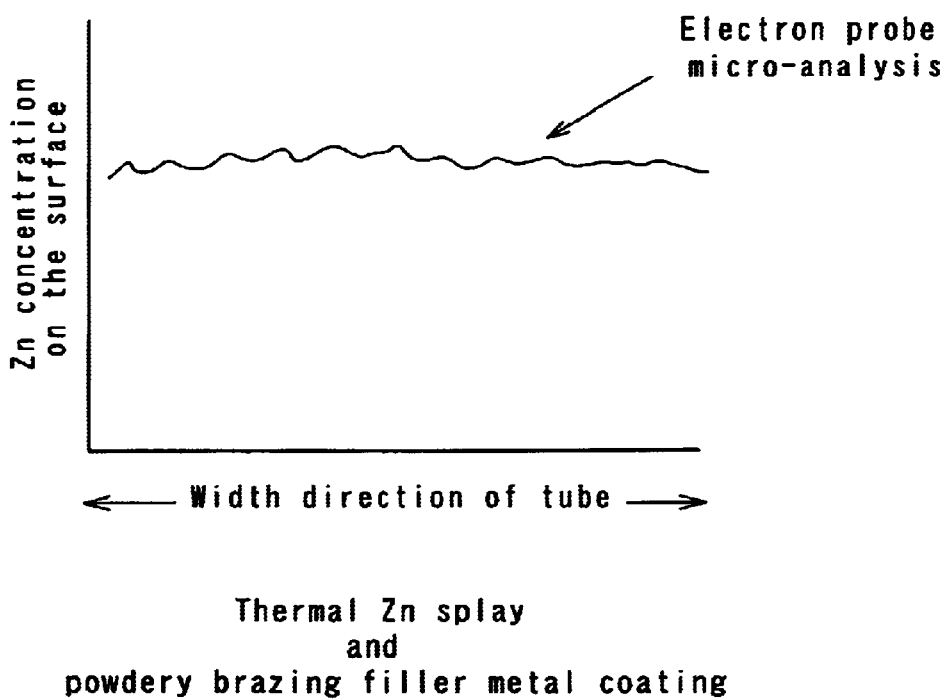
FIG. 4 is a graph showing the Zn concentration distribution on the surface of a tube after brazing in the heat exchanger of this invention.

The heat exchanger of this invention can be used for various applications such as motor vehicles, and is not especially limited in application. As for the particular structure, it is only required that there are joints between a header and tubes. The joint types and other structures are not especially limited.

The tubes are made of Al or Al alloy. The ingredients of the tubes are not especially limited, and adequate ingredients can be selected. The tubes are usually produced by means of extrusion molding, but in this invention, the production method is not especially limited. The header is also made of Al or Al alloy. The production method of the header is not especially limited either in this invention.

The heat exchanger of this invention usually has fins disposed between the tubes in addition to the tubes and the header. The fins can also be made of Al or Al alloy, and if the fins contain Zn, the sacrificial anode effect can be enhanced to improve the corrosion resistance of the tubes.

The tubes of this invention have a thermally Zn-sprayed layer formed. The thermally sprayed layer can be formed by a conventional method, and the desirable range of the thermally sprayed amount of Zn is as described before.

Furthermore, as the upper layer of the thermally Zn-sprayed layer and as the surface layer of the header, a brazing filler metal layer made of a powdery brazing filler metal is formed. The powdery brazing filler metal consists of 5 to 60 weight % of Si and the balance of Al and unavoidable impurities as described before.

The powdery brazing filler metal can be produced by powdering a brazing filler metal according to a conventional method, and adjusted to an adequate particle size. It is desirable that the particle size is in the range described in claim 2. The powdery brazing filler metal for the tubes and that for the header can be prepared separately, but it is desirable that they are obtained by classifying one powdery brazing filler metal. As the classification method, any one of sieving, air classification, wet classification, etc. can be adequately selected.

The aluminum alloy powder is mixed with a flux as desired for use as the powdery brazing filler metal. They can be mixed at an adequate mixing ratio.

As the flux, a fluoride flux or chloride flux, etc. can be used, but in this invention, the kind of it is not especially limited.

When the powdery brazing filler metal is deposited on the joints, any of various solvents and any of various binders may be mixed to facilitate the deposition. Examples of the solvent include water, alcohols (especially aliphatic alcohols having 1 to 8 carbon numbers), etc.

The binder can be any binder if it can well anchor the powder without degrading the properties of the joints, and a water-soluble high molecular compound having carboxyl groups or an acrylic or methacrylic resin can be used.

The above-mentioned powdery alloy is adequately mixed and is deposited on the members to be joined. The method for the depositing is not especially limited either in this invention, and for example, such a means as spraying, showering, flow coating, roll coating, brush coating or immersion can be used.

In the method for production of this invention, as shown in FIG. 1, a brazing filler metal layer 2 is formed on the surface of a header 1 using said powdery brazing filler metal. On the other hand, a thermally Zn-sprayed layer 4 is formed on the surfaces of tubes 3, and a brazing filler metal layer 5 is formed on the thermally Zn-sprayed layer 4 using said powdery brazing filler metal. The tubes 3 are inserted into the holes 1a of the header 1, and radiating fins 6 are disposed between the tubes 3 to construct an assembly for a heat exchanger. The assembly is heated at an adequate temperature in an adequate atmosphere to melt the brazing filler metal. It is desirable that the heating temperature in this case is 580 to 620° C. If the heating temperature is lower than 580° C., the brazing filler metal and the base metal partially remain solid, making it hard to achieve good brazing. On the other hand, if higher than 620° C., remarkable corrosion occurs. So, said temperature range is desirable.

As a result of the above-mentioned heating, while the Zn of the thermally Zn-sprayed layer is uniformly diffused, the tubes 3 are brazed strongly to the header 1, and furthermore the fins 6 are bonded to the tubes 3. The obtained heat exchanger is well bonded at the header, tubes and fins, and exhibits good corrosion resistance.

EXAMPLES

Examples of this invention are described below in comparison with comparative examples.

Example 1

A ingot made of JIS A 1070 Al alloy was extruded to obtain extruded tubes, and Zn was thermally sprayed to the extruded Al alloy tubes immediately after molding, to prepare Zn-covered Al alloy tubes having a thermally Zn-sprayed layer by 10 g/m$^2$ on the surfaces of the tubes. On the other hand, a header made of JIS A 3003 Al alloy with openings for allowing insertion of the tubes was prepared by means of extrusion molding, and furthermore corrugated fins made of JIS A 3003 Al alloy were prepared.

Moreover, one part by weight of a flux and one part by weight of a binder were mixed with 10 parts by weight of Al-12% Si binary alloy powder with an average particle size of 20 $\mu$m obtained by atomizing a molten Al alloy, to prepare a brazing filler metal slurry. Said thermally Zn-sprayed Al alloy tubes were coated with the brazing filler metal slurry by 50 g/m$^2$, to prepare thermally Zn-sprayed extruded tubes of this invention. As a comparative example, thermally Zn-sprayed extruded tubes not coated with a brazing filler metal were prepared. The header prepared as described above was coated with 200 g/m² of the brazing filler metal slurry, to form a brazing filler metal layer.

Said tubes were inserted into the openings of said header, to prepare a frame of a heat exchanger, and furthermore, the corrugated fins were installed between the tubes, to prepare an assembly consisting of the header, tubes and fins. The obtained assembly was placed in a heating furnace and held in the heating furnace kept at 600° C. in nitrogen gas atmosphere for 3 minutes, for heating to prepare a heat exchanger having the header, tubes and fins bonded with fillets.

The corrosion resistance at the tube/header joints of the obtained heat exchanger was evaluated according to the CASS Test(Copper Accelerate Acetic Acid Salt Splay Test). At the CASS Test, Acid salt (hot at 50□) including 0.26 g/l of cupric chloride was sprayed continuously (proper times) against the assembly at a test room temperature of 50□.

In the CASS Test, a case where the fillets at the joints were corroded uniformly from the exposed surfaces is expressed by "○"; a case where the thermally Zn-sprayed layer remaining on the surfaces of the tubes was preferentially corroded with the corrosion reaching inside the fillets is expressed by "□", and a case where through holes due to corrosion were formed in the fillets is expressed by "x". The results are shown in Table 1.

As can be seen from the Table 1, the heat exchanger of this invention having a brazing fillet metal layer formed on the surfaces of the tubes was excellent in the corrosion resistance at the joints with the header. On the other hand, the heat exchanger of the comparative example without any brazing filler metal layer formed on the surfaces of the tubes was poor in corrosion resistance, since corrosion occurred early at the joints.

TABLE 1

Results of corrosion resistance evaluation at tube/header joints according to CASS

| Tubes | Corrosion state | | | |
|---|---|---|---|---|
| | CASS240h r | CASS480h r | CASS720h r | Example |
| Thermally Zn-sprayed layer only | □ | x | x | Comparative example |
| Thermally Zn-sprayed layer + brazing filler metal layer | ○ | ○ | ○ | Present invention |

Example 2

Thermally Zn-sprayed extruded tubes and a header were coated with a brazing filler metal to produce heat exchangers as described for Example 1, except that the powdery brazing filler metal of the brazing filler metal slurry in Example 1 was sieved for classification into various divisions different in average particle size.

For the obtained heat exchangers, the brazing property at the tube/header joints was evaluated. For the brazing property, a case where the clearances at the joints could be perfectly filled with the brazing filler metal is expressed by "○", and a case where the clearances were filled imperfectly is expressed by "□". The results are shown in Table 2.

As can be seen from Table 2, in the cases where the average particle size of the powdery brazing filler metal applied to the header was larger than the average particle size of the powdery brazing filler metal applied to the tubes, the most excellent brazing property could be obtained.

TABLE 2

Brazing properties at the tube/header joints due to the difference in particle size of powdery brazing filler metal

| No. | Member | Average particle size of powdery brazing filler metal (μm) | Coating amount of powdery brazing filler metal at header (g/m²) | Brazing property |
|---|---|---|---|---|
| 1 | Tube | 5 | 200 | □ |
|   | Header | 5 | | |
| 2 | Tube | 5 | 200 | ○ |
|   | Header | 55 | | |
| 3 | Tube | 30 | 200 | ○ |
|   | Header | 70 | | |
| 4 | Tube | 40 | 200 | ○ |
|   | Header | 120 | | |
| 5 | Tube | 20 | 200 | □ |
|   | Header | 0.5 | | |

As described above, the heat exchanger produced by this invention is characterized in that Al or Al alloy tubes, each having a thermally Zn-sprayed layer formed on the surface of it, and having a brazing filler metal layer formed on said thermally Zn-sprayed layer using a powdery brazing filler Al alloy composed of 5 to 60 weight % of Si and the balance of Al and unavoidable impurities, are brazed to an Al or Al alloy header having a brazing filler metal layer formed using a powdery brazing filler Al alloy composed of 5 to 60 weight % of Si and the balance of Al and unavoidable impurities. Therefore, the tubes and the header are strongly bonded to each other, and Zn is uniformly diffused and distributed. So, the heat exchanger shows good corrosion resistance.

Furthermore, the process for producing a heat exchanger of this invention comprises the steps of preparing a powdery brazing filler Al alloy consisting of 5 to 60 weight % of Si and the balance of Al and unavoidable impurities; classifying it into a fine alloy powder and a coarse alloy powder; depositing the fine alloy powder on the Al or Al alloy tubes having the thermally Zn-sprayed layer formed on the surfaces; depositing the coarse alloy powder on the Al or Al alloy header; and brazing the tubes and the header to each other. Therefore, the above-mentioned effects can be obtained, and the brazing filler metal can be used without waste.

What is claimed is:

1. A method for production of a heat exchanger, comprising the steps of preparing a powdery brazing filler Al alloy consisting of 5 to 60 weight % of Si and the balance of Al and unavoidable impurities; classifying it into a fine alloy powder and a coarse alloy powder; depositing the fine alloy powder on the Al or Al alloy tubes having the thermally Zn-sprayed layer formed on the surfaces; depositing the coarse alloy powder on the Al or Al alloy header; and brazing the tubes and the header to each other.

2. The method for production of the heat exchanger according to claim 1, wherein the average particle size of the powdery brazing filler Al alloy is 0.5 to 200 μm.

3. The method for production of the heat exchanger according to claim 2, wherein the average particle size of the powdery brazing filler metal of the brazing filler metal layer on the thermally Zn-sprayed tubes is 0.5 to 100 μm, while the average particle size of the powdery brazing filler metal of the brazing filler metal layer on the header is 1 to 200 μm, and the average particle size of the powdery brazing filler metal of the brazing filler metal layer on the header is larger than the average particle size of the powdery brazing filler metal of the brazing filler metal layer on the thermally Zn-sprayed tubes.

4. The method for production of the heat exchanger according to claim 1, wherein the brazing filler metal layer of the thermally Zn-sprayed tubes and/or the brazing filler metal layer of the header contains a flux mixed.

5. The method for production of the heat exchanger according to claim 4, wherein the flux and the powdery brazing filler metal bond using a binder.

6. The method for production of the heat exchanger according to claim 1, wherein fins-made of a Zn containing Al alloy dispose between the said tubes.

7. The method for production of the heat exchanger according to claim 4, wherein fins made of a Zn containing Al alloy dispose between the said tubes.

8. The method for production of the heat exchanger according to claim 2, wherein the brazing filler metal layer of the thermally Zn-sprayed tubes and/or the brazing filler metal layer of the header contains a flux mixed.

9. The method for production of the heat exchanger according to claim 3, wherein the brazing filler metal layer of the thermally Za-sprayed tubes and/or the brazing filler metal layer of the header contains a flux mixed.

10. The method for production of the heat exchanger according to claim 2, wherein fins made of a Zn containing Al alloy dispose between the said tubes.

11. The method for production of the heat exchanger according to claim 3, wherein fins made of a Zn containing Al alloy dispose between the said tubes.

12. The method for production of the heat exchanger according to claim 5, wherein fins made of a Zn containing Al alloy dispose between the said tubes.

* * * * *

UNITED STATES PATENT AND TRADEMARK OFFICE
CERTIFICATE OF CORRECTION

PATENT NO.     : 6,708,869 B2
DATED          : March 23, 2004
INVENTOR(S)    : Yasunori Hyogo, Akira Watanabe and Ken Tohma It is certified that error appears in the above-identified patent and that said Letters Patent is hereby corrected as shown below:

Column 7,
Lines 16 and 18, change "50☐" to read -- 50°C --

Signed and Sealed this

Twenty-third Day of November, 2004

JON W. DUDAS
*Director of the United States Patent and Trademark Office*